(12) United States Patent
White et al.

(10) Patent No.: US 9,818,065 B2
(45) Date of Patent: Nov. 14, 2017

(54) ATTRIBUTION OF ACTIVITY IN MULTI-USER SETTINGS

(71) Applicant: Microsoft Corporation, Redmond, WA (US)

(72) Inventors: Ryen White, Woodinville, WA (US); Ahmed Hassan Awadallah, Redmond, WA (US); Adish Singla, Zurich (CH); Eric Horvitz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 568 days.

(21) Appl. No.: 14/206,115

(22) Filed: Mar. 12, 2014

(65) Prior Publication Data

US 2015/0262077 A1    Sep. 17, 2015

(51) Int. Cl.
    *G06F 15/18*    (2006.01)
    *G06N 99/00*    (2010.01)

(52) U.S. Cl.
    CPC .................................. *G06N 99/005* (2013.01)

(58) Field of Classification Search
    CPC ................ G06C 30/02; G06C 30/0251; G06F 17/30864; G06F 17/30598
    USPC ......................................... 706/12, 15, 20, 45
    See application file for complete search history.

(56) References Cited

U.S. PATENT DOCUMENTS

| | | | | |
|---|---|---|---|---|
| 7,117,208 B2 * | 10/2006 | Tamayo | ............ | G06F 17/30539 707/777 |
| 7,970,664 B2 * | 6/2011 | Linden | .................. | G06Q 30/02 705/26.1 |
| 9,262,767 B2 * | 2/2016 | Sercinoglu | ............. | G06Q 30/02 |
| 2005/0222989 A1 | 10/2005 | Haveliwala et al. | | |
| 2006/0015504 A1 * | 1/2006 | Yu | ...................... | G06F 17/30864 |
| 2006/0064411 A1 | 3/2006 | Gross et al. | | |
| 2009/0144237 A1 | 6/2009 | Branam et al. | | |
| 2010/0094704 A1 | 4/2010 | Subramanian et al. | | |
| 2012/0036011 A1 | 2/2012 | Schechter et al. | | |
| 2012/0239519 A1 | 9/2012 | Wu et al. | | |
| 2013/0282713 A1 | 10/2013 | Lawrence | | |
| 2013/0290503 A1 | 10/2013 | Rajkumar et al. | | |
| 2016/0099848 A1 * | 4/2016 | Krynski | ............. | H04L 12/6418 709/224 |
| 2017/0054819 A1 * | 2/2017 | Huffaker | ................. | H04L 67/22 |

OTHER PUBLICATIONS

Krishnamoorthi, Data Processing and Easy Access Retrieval of Data through Data Ware House, 2009, Proceedings of the World Congress on Engineering and Computer Science 2009 vol. I, pp. 1-6.*

(Continued)

*Primary Examiner* — David Vincent
(74) *Attorney, Agent, or Firm* — International IP Law Group, PLLC

(57) ABSTRACT

The claimed subject matter includes a system and method for attribution of search activity in multi-user settings. The method includes training a classifier to distinguish between machines that are single-user and multi-user based on activity logs of an identified machine. The identified machine is determined to be multi-user based on the classifier. A number of users is estimated for the identified machine. Activity of the users is clustered based on the number of users estimated. A similarity function is learned for the number of users estimated. The method also includes assigning new activity to one of the users based on the clustering, and the similarity function.

21 Claims, 10 Drawing Sheets

(56) References Cited

OTHER PUBLICATIONS

Eirinaki et al., Web Mining for Web Personalization, 2003, SJSU ScholarWorks, pp. 1-23.*
Amari, et al., "A New Learning Algorithm for Blind Signal Separation", In Proceedings of Neural Information Systems, Dec. 2, 1996, 7 pages, Saitama, JP.
Anand, et al., "Blind Separation of Multiple Co-Channel BPSK Signals Arriving at an Antenna Array", In IEEE Signal Letters, vol. 2, No. 9, Sep. 1995, pp. 176-178.
Barabasi, Albert-Laszlo, "The Origin of Bursts and Heavy Tails in Human Dynamics", In Proceedings of Nature, 435, Issue 7039, May 12, 2005, 5 pages, pp. 207-211, Notre Dame, IN, USA.
Bennett, et al., "Classification-Enhanced Ranking", In Proceedings of the 19th International Conference on World Wide Web, Apr. 26, 2010, pp. 111-120, Raleigh, NC, USA.
Bhavnani, Suresh K., "Important Cognitive Components of Domain-Specific Search Knowledge", In Proceedings of the Tenth Text Retrieval Conference, Nov. 13, 2001, 8 pages.
Bilenko, et al., "Predictive Client-Side Profiles for Personalized Advertising", In Proceedings of the 17th ACM SIGKDD Conference on Knowledge Discovery and Data Mining, Aug. 21, 2011, pp. 413-421, San Diego, CA, USA.
Buscher, et al., "Large-Scale Analysis of Individual and Task Differences in Search Result Page Examination Strategies", In Proceedings of the fifth ACM Conference on Web Search and Data Mining, Feb. 8, 2012, pp. 373-382, Seattle, WA, USA.
Cadez, et al., "Visualization of Navigation Patterns on a Web Site Using Model-Based Clustering", In Proceedings of the Sixth ACM SIGKDD International Conference on Knowledge Discovery and Data Mining, Aug. 20, 2000, pp. 280-284, Boston, MA, USA.
Cardoso, Jean-Francois, "Blind Signal Separation: Statistical Principles", In Proceedings of the IEEE, vol. 86, Issue 10, Oct. 1998, pp. 2009-2025, Paris, France.
Chen, et al., "Large-Scale Behavioral Targeting", In Proceedings of the 15th ACM SIGKDD Conference on Knowledge Discovery and Data Mining, Jun. 28, 2009, pp. 209-217, Paris, France.
Comon, Pierre, "Independent Component Analysis, a New Concept?", In Journal of Signal Processing—Special Issue on Higher Order Statistics, vol. 36, Issue 3, Apr. 1994, pp. 287-314.
Dasgupta, et al., "Overcoming Browser Cookie Churn with Clustering", In Proceedings of the fifth ACM Conference on Web Search and Data Mining, Feb. 8, 2012, pp. 83-92, Seattle, WA, USA.
Dou, et al., "A Large-Scale Evaluation and Analysis of Personalized Search Strategies", In Proceedings of the 16th International Conference on World Wide Web, May 8, 2007, pp. 581-590, Banff, Alberta, Canada.
Downey, et al., "Models of Searching and Browsing: Languages, Studies, and Applications", In Proceedings of the 20th International Joint Conference on Artifical Intelligence, Jan. 2007, 8 pages.
Dumais, et al., "Individual Differences in Gaze Patterns for Web Search", In Proceedings of the third Symposium on Information Interaction in Context, Aug. 18, 2010, pp. 185-194.
Dupret, et al., "A User Browsing Model to Predict Search Engine Click Data from Past Observations", In Proceedings of the 31st Annual International ACM SIGIR Conference on Research and Development in Information Retrieval, Jul. 20, 2008, pp. 331-338.
Fawcett, et al., "Adaptive Fraud Detection", In Proceedings of Data Mining and Knowledge Discovery, vol. 1, Issue 3, Kluwer Academic Publishers, Sep. 1997, pp. 291-316.
File, Thom, "Computer and Internet Use in the United States", U.S. Census Bureau, Published on: Jun. 2013, Available at: http://www.census.gov/prod/2013pubs/p20-569.pdf, pp. 1-14.
Fulgoni, Gian M., "The "Professional Respondent" Problem in Online Survey Panels Today", Com Score Networks, MRA Annual Conference, Published on: Jun. 2005, Available at: http://www.sigmavalidation.com/tips/05_06_02_Online_Sur-vey_Panels.ppt.
Friedman, et al., "Additive Logistic Regression: A Statistical View of Boosting", In Journal of Annals of Statistics, Aug. 20, 1998, pp. 1-45.
Hu, et al., "Effects of Search Success on Search Engine Re-Use", In Proceedings of ACM Conference on Information and Knowledge Management, Oct. 24, 2011, pp. 1841-1846, Glasgow, Scotland, UK.
Joachims, Thorsten, "Optimizing Search Engines Using Clickthrough Data", In Proceedings of the Eighth ACM SIGKDD International Conference on Knowledge Discovery and Data Mining, Jul. 23, 2002, pp. 133-142, Edmonton, Alberta, Canada.
Kobsa, Alfred, "Privacy-Enhanced Personalization", In Proceedings of Communications of the ACM, vol. 50, No. 8, Aug. 2007, pp. 24-33.
Krause, et al., "A Utility-Theoretic Approach to Privacy and Personalization", In Proceedings of 23rd National Conference on Artificial Intelligence, vol. 2, Jul. 13, 2008, 8 pages.
Lau, et al., "Patterns of Search: Analyzing and Modeling Web Query Refinement", In Proceedings of the Seventh International Conference on User Modeling, Jun. 1, 1999, 10 pages.
MacQueen, J., "Some Methods for Classification and Analysis of Multivariate Observations", In Proceedings of the Fifth Berkeley Symposium on Mathematical Statistics, Jun. 1967, pp. 281-297.
Matthijs, et al., "Personalizing Web Search Using Long Term Browsing History", In Proceedings of the Fourth ACM International Conference on Web Search and Data Mining, Feb. 9, 2011, 10 pages, Hong Kong, China.
Richardson, Matthew, "Learning about the World through Long-Term Query Logs", In ACM Transactions on the Web, vol. 2, Issue 4, Article 21, Oct. 2008, 27 pages.
Shen, et al., "Analysis of Topic Dynamics in Web Search", In Proceedings of Special Interest Tracks and Posters of the 14th International Conference on World Wide Web, May 10, 2005, 2 pages, Chiba, Japan.
Shen, et al., "Implicit User Modeling for Personalized Search", In Proceedings of the 14th ACM International Conference on Information and Knowledge Management, Oct. 31, 2005, pp. 824-831, Bremen, Germany.
Sontag, et al., "Probabilistic Models for Personalizing Web Search", In Proceedings of ACM Conference on Web search and Data Mining, Feb. 8, 2012, pp. 433-442, Seattle, WA, USA.
Tan, et al., "Mining Long-Term Search History to Improve Search Accuracy", In Proceedings of the 12th ACM SIGKDD International Conference on Knowledge Discovery and Data Mining, Aug. 20, 2006, pp. 718-723, Philadelphia, PA, USA.
Teevan, et al., "Personalizing Search via Automated Analysis of Interests and Activities", In Proceedings of the 28th Annual International ACM SIGIR Conference on Research and Development in Information Retrieval, Aug. 15, 2005, pp. 449-456, Salvador, Brazil.
Teevan, et al., "Understanding and Predicting Personal Navigation", In Proceedings of Web Search and Data Mining, Feb. 9, 2011, pp. 85-94, Hong Kong, China.
Thompson, et al., "A Language Modeling Approach to Predicting Reading Difficulty", In Proceedings of the Human Language Technology, May 2, 2004, 8 pages.
White, et al., "Characterizing the Influence of Domain Expertise on Web Search Behavior", In Proceedings of ACM International Conference on Web Search and Data Mining, Feb. 9, 2009, 10 pages, Barcelona, Spain.
White, et al., "Investigating Behavioral Variability in Web Search", In Proceedings of the 16th International Conference on World Wide Web, May 8, 2007, pp. 21-30, Banff, Alberta, Canada.
White, et al., "Investigating the Querying and Browsing Behavior of Advanced Search Engine Users", In Proceedings of the 30th Annual International ACM SIGIR Conference on Research and Development in Information Retrieval, Jul. 23, 2007, pp. 255-262, Amsterdam, The Netherlands.
White, et al., "Predicting Short-Term Interests Using Activity-Based Search Context", In Proceedings of the 19th ACM International Conference on Information and Knowledge Management, Oct. 26, 2010, pp. 1009-1018, Toronto, Ontario, Canada.
White, et al., "Predicting User Interests from Contextual Information", In Proceedings of the 32nd International ACM SIGIR Con-

(56) References Cited

OTHER PUBLICATIONS ference on Research and Development in Information Retrieval, Jul. 19, 2009, pp. 363-370, Boston, MA, USA.

Xiang, et al., "Context-Aware Ranking in Web Search", In Proceedings of the 33rd International ACM SIGIR Conference on Research and Development in Information Retrieval, Jul. 19, 2010, pp. 451-458, Geneva, Switzerland.

Yan, et al., "How Much Can Behavioral Targeting Help Online Advertising?", In Proceedings of Conference on World Wide Web, Apr. 20, 2009, pp. 261-270, Madrid, Spain.

Zhao, et al., "Criterion Functions for Document Clustering: Experiments and Analysis", In Proceedings of Conference on Information and Knowledge Management, Nov. 4, 2002, pp. 1-30.

\* cited by examiner

100

300

400

400

400

400

700

800

ATTRIBUTION OF ACTIVITY IN MULTI-USER SETTINGS

BACKGROUND

Given the move toward online services taking place in a range of applications, including productivity applications and operating systems, tools for accurately attributing observed activity to the correct person are becoming increasingly important. Online services frequently rely on unique identifiers, such as internet protocol (IP) addresses or Web browser cookies, to tailor offerings to their users based on how the user is perceived to use online services at a specific computing device (machine). Usage may be determined based on search histories, application usage (e.g., gaming, word-processing tools), and so on.

Typically, usage is based on the assumption that each machine identifier maps to an individual user. However, shared machines are common. As such, determining what to offer based on usage on a specific machine can be challenging. In cases where there is a shared machine, the search histories of multiple users are interwoven and are assigned the same identifier, creating noisy signals for any online service attempting to determine how to personalize its advertising, search results, or other services, to the current user.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

A system and method attribute activity in multi-user settings. The method includes training a classifier to distinguish between machines that are single-user and multi-user based on activity logs of an identified machine. The identified machine is determined to be multi-user based on the classifier. A number of users is estimated for the identified machine. Activity of the users is clustered based on the number of users estimated. A similarity function is learned for the number of users estimated. The method also includes assigning new activity to one of the users based on the clustering, and the similarity function.

Embodiments include one or more computer-readable storage memory devices for storing computer-readable instructions. The computer-readable instructions attribute activity in multi-user settings when executed by one or more processing devices. The computer-readable instructions include code configured to train a classifier to distinguish between machines that are single-user and multi-user based on activity logs of an identified machine. The identified machine is determined to be multi-user based on the classifier. A number of users is estimated for the identified machine. Activity of the users is clustered based on the number of users estimated. A similarity function is learned for the number of users estimated. New activity is assigned to one of the users based on the clustering, and the similarity function. A recommendation is made for the one user, the recommendation comprising one of a movie, book, song, video, or game.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 2:
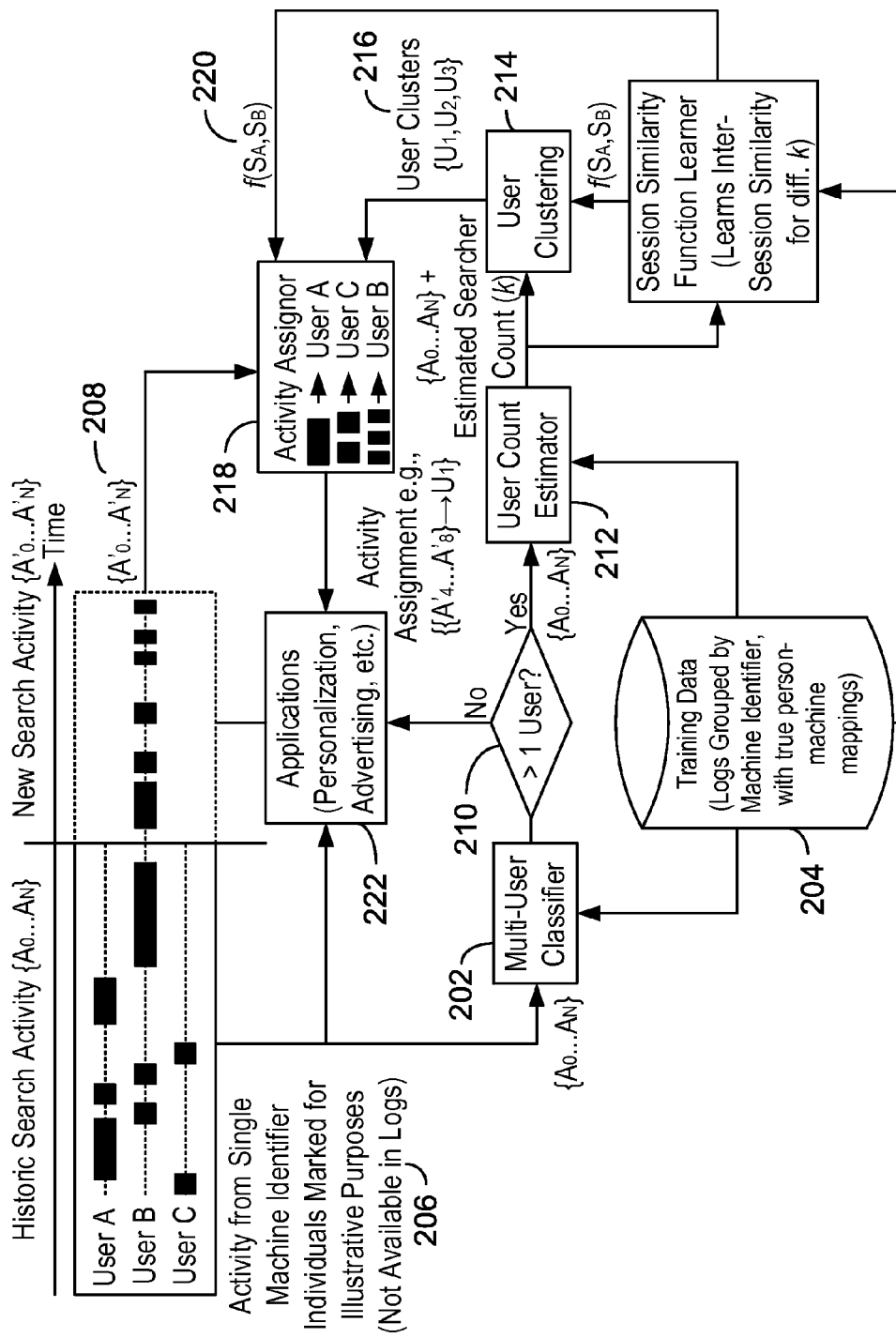
FIG. 2 is a graph showing the fraction of machine identifiers in a dataset that are comprised by different numbers of searchers. according to embodiments described herein.

As a preliminary matter, some of the Figures describe concepts in the context of one or more structural components, variously referred to as functionality, modules, features, elements, or the like. The various components shown in the Figures can be implemented in any manner, such as software, hardware, firmware, or combinations thereof. In some embodiments, various components reflect the use of corresponding components in an actual implementation. In other embodiments, any single component illustrated in the Figures may be implemented by a number of actual components. The depiction of any two or more separate components in the Figures may reflect different functions performed by a single actual component. FIG. 2, discussed below, provides details regarding one system that may be used to implement the functions shown in the Figures.

Other Figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may include communication media such as transmission media for wireless signals and the like.

Introduction

User identifiers factor into a range of applications on the Web, including behavioral analysis, personalized search, and online advertising. User identifiers are assigned to a machine via different mechanisms such as browser cookies or browser toolbars. User identifiers are also referred to herein as machine identifiers. The motivation behind the decision to have a single identifier tied to a machine or application is founded on the belief that there is a mapping between the identifiers and individual users. However, for shared machines in homes and workplaces this may not be the case. Although recent estimates suggested that 75% of households in the United States have a computer, in most of those households, machines are shared between multiple individuals. Different people may use the shared machine at different times, but to a remote observer, all activity is associated with a single identifier. Consequently, users' search behaviors are intertwined in search logs. This creates a noisy behavioral signal, which is a challenge when trying to analyze search behavior, and long-term behavior, which are useful in many applications, such as search personalization.

Recently, an Internet analytics company gathered real-world data from a panel of millions of Web searchers. In addition to a machine identifier similar to that obtained via Web browser cookies and other applications, panelists have a person identifier to sign-in prior to use to indicate who is searching on the machine at a particular time. With both machine and person identifiers, it is possible to compute the frequency with which multiple people are observed searching on a particular machine, as well as other characterizations of search engine usage and searcher interests that are reported later. This data can also be used as a ground truth in developing models to estimate the number of searchers within a machine identifier, and in attributing search activity observed historically to specific searchers.

Figure 1:
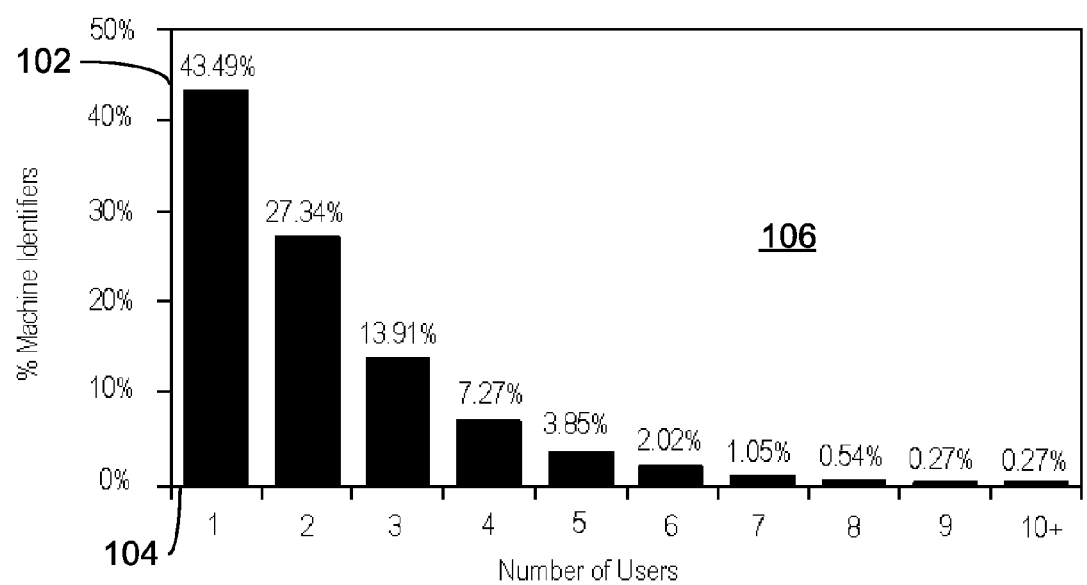
FIG. 1 is a block diagram of an example system for attribution of search activity in multi-user settings according to embodiments described herein.

FIG. 1 is a graph 100 showing the fraction of machine identifiers in a dataset that include different numbers of searchers, according to embodiments described herein. FIG. 1 shows the fraction 102 of machine identifiers 104 broken down by the different numbers of searchers 106 on their machines. The term, searcher, is used herein interchangeably with user and person.

From the 43.5% machine identifiers limited to one searcher, it appears most (56.5%) machines are used by more than one person. Although these statistics represent only one data source, the data are intentionally gathered from a representative sample of United States households. The mean and median number of users per machine observed in the data are 2.39 and 2 respectively, aligning with U.S. census estimates of household size (mean=2.55).

Applications such as personalization and advertising assume that there is a direct mapping between machine identifiers and users. Given the prevalence of multiple users associated with the same identifier, the performance of such methods could be harmed. There are also privacy benefits of being able to accurately segregate user activity within a machine. For example, it may prevent the unintended sharing of sensitive information between users on the same machine and help ensure that information shared with online services is limited.

Embodiments of the claimed subject matter characterize variations in the search behaviors within a single machine, and develop predictive models to assign observed search activity to the correct individual. In doing so, the bursty nature in which human events typically occur may be more readily engaged, and made more efficient. Embodiments of the claimed subject matter include online services that can customize their services to specific users based on the long-term behavior of the user. The user may be identified despite being one of multiple users on an identified computing device (device, or machine). Customizations may include, for example, targeted advertising, search personalization, and recommendations for various media, such as movie recommendations. Instead of asking the user for identity confirmation, the present techniques automatically identify users by their long-term behavior. Embodiments associate specific actions to specific users based on long-terms behavior trends from one machine. Additionally, embodiments classify multiple attributes of behavior based on query lengths, the number of queries, and clicks within specific time periods. These attributes are useful in determining whether there are multiple users as they typically vary. More specifically, there are two ways they may vary: (1) user—there are individual differences in how people search, and (2) quantity—there are is a greater quantity of queries, clicks, etc. associated with an identifier if there are multiple users associated with it.

When shared machines appear in search logs, the interwoven search histories can affect the performance of algorithms that assume a 1:1 mapping between observed search behavior and searchers (e.g., search personalization). Given a machine identifier assigned by a mechanism such as a Web browser cookie, or a browser-associated add-in, embodiments described herein attribute observed search activity to the individual users. In embodiments with online search services, the user is also referred to as a searcher. The present techniques determine whether the machine identifier is associated with the search activity of multiple searchers. If so, the activity is associated with the different users. Additionally, the searcher may be determined for new (incoming) search activity.

Embodiments may include: methods for predicting whether a machine has search activity for multiple searchers (this is a binary classification task—one vs. many searchers); methods for estimating the number of users associated with the machine (this is a regression task); methods for clustering search behavior into coherent groups that closely resemble the actual grouping of users on a machine; methods for assigning new search behavior to people, rather than grouping everything from the machine identifier together as a single group; applications of these methods in real-time, and retrospectively, for specific applications such as, personalization, advertising. Additionally, search engine performance metrics may be determined, such as, sessions per unique user. Beyond applications associated with personalization, an additional application is privacy shielding, allowing queries from multiple searchers on a shared machine to be hidden from other users.

Embodiments provide a classifier for multi-user prediction: determining whether a machine is used by multiple users. This is a binary classifier, trained using a range of features considered to be indicative of multiple people using the machine, e.g., temporal, topical, behavioral, and referential content. Referential content means making reference to another person who is likely to reside in the household, e.g., a spouse. Behavioral content includes features of the nature of the resources selected, and their complexity. Variations in the features (e.g., entropy) can be useful because they may reflect the search patterns and interests of multiple searchers. Given these feature sets for an identifier, machine learning can be employed to learn a model to perform the prediction. The output of this step could be used to inform the application of the next step, to count the number of searchers associated with a machine identifier. The rationale for this decision is that the binary classification might be more accurate than thresholding the output from a regressor.

Embodiments also provide user count estimation. This is a regression task, where the goal is to accurately predict the number of searchers (k) associated with a machine identifier (rather than simply whether the number exceeds one, as is the case in the previous task). This estimate can be used to guide later steps in the pipeline. The same features can be used for this task as for the multi-user prediction task, although the features may trend towards different models, Topic as determinative for regression, Time for classification.

Additionally, embodiments clustering user behavior. This involves grouping together the search activity from a machine identifier into coherent clusters that can represent a person. This can be performed at a number of different levels, including query and session. At the session level, richer features of search behavior can be extracted. Additionally, sessions are typically a coherent unit of analysis, and also, one searcher. Many of the same features used for the multi-user prediction may be leveraged to estimate a k that emerges from the regressor to guide this clustering step.

Further, embodiments provide a similarity function. One of the components for task of attribution is measuring similarity between two search activities. Each search activity is represented as a set features, informed by characterization and prediction results. A vector is built, representing the issued query terms, clicked Web domains, search engine domains, ODP and query categories. This vector may serve as a fingerprint of the activity. Given two search activities denoted by their representative features, 20 or so features may capture pairwise similarity and differences between two activities for different feature classes. For vector-based features, e.g., a vector of query terms, the cosine similarity of two vectors to is used to compute a similarity score. Features such as, "Sim_Weekday," or, "Sim_Nightlife," represent binary values denoting whether both activities share same attribute. Regression is used for learning a pairwise similarity function. The identification of the base prior two activities belonging to the same searcher depends on the number of searchers associated with a machine identifier (e.g., similarity score is always 1 for single user machines). Accordingly, embodiments include different regression models for different k values. For training data, 10% of the machine identifiers are randomly sampled, and split into five groups containing 2, 3, 4, 5, and 6-10 users (the last group comprised as range of k to provide sufficient training data). The regression model for each group learned separately as follows: every pair of sessions for machines in a group, computed the pairwise features between them and labeled it as 1 if they belong to same searcher, otherwise 0. This labeled data is then used to train the regressor, which learns to predict a real valued number used as the similarity score between two sessions.

Embodiments assign search behavior. Given new search queries, the clustering and similarity function may assign search activity as having been performed by a specific searcher. One challenge is the historic logs are unlabeled; hence, there is no prior information of which activity in historic logs belongs to which searcher. This task is performed in two steps: (1) perform clustering on the historic logs as described previously, (2) assign the new search activity to one of the clusters based on similarity between that new activity and the clustering. Given that sessions contain only one person, the assignment task can be performed using the first query in the session. This assumes the person does not change for the remainder of the session. The person assignment may be improved by performing the assignment after each action (query, result click, etc.), allowing for potentially better prediction performance.

Embodiments assign applications. Work on applying the assignment technology for search personalization is currently in progress. Accurate assignment creates a cleaner behavioral signal, allowing for more accurate personalization for search and advertising in real-time. Other methods, such as, shielding search histories from other users of shared machines, or augmenting search-log data with a user identifier, for more accurate data mining and log analysis.

Embodiments include methods for the accurate attribution of historic search activity to individual searchers. Using ground truth data for a sample of almost four million U.S. Web searchers—containing both machine identifiers and person identifiers—over half of the machine identifiers include the queries of multiple people. Variations are characterized in features of topic, time, and other aspects, such as the complexity of the information sought, per the number of searchers on a machine. Such methods show clear differences in all measures. Based on these insights, models are developed to accurately estimate when multiple people contribute to the logs ascribed to a single machine identifier, as well as developing models to cluster search behavior on a machine, attributing historical data accurately, and automatically identifying the user for new queries. These findings have implications for the design of applications, such as personalized search and advertising, which typically rely on unique machine identifiers to tailor the services that they provide.

FIG. 2 is a block diagram of an example system 200 for attribution of search activity in multi-user settings, in accordance with embodiments. The system 200 includes classifiers 202 trained using Training Data 204, such as, search logs augmented with information 206 about machine identifiers and person identifiers. Once trained, these classifiers 202 are presented with search activity data 208 from a machine identifier. These data are classified at block 210 to determine whether multiple searchers are present. If so, at block 212, the number of users is estimated and, at block 214, the search activity is clustered using the user-count estimate (k) as a guide. The resultant user clusters 216 are passed as input to the activity assignor 218, along with the learned similarity function 220 for that estimated value of k. New search activity is assigned to the searcher most similar to the current searcher and the output of that is used for applications 222. The other applications could include personalization, assigning a more accurate user identifier to historic search-log data, or other applications such as metric computation (e.g., more accurate computation of the number of sessions per unique user).

Dataset

An example implementation uses the dataset previously described as ground truth data. The sample includes almost four million U.S. Web searchers—containing both machine identifiers and person identifiers. Using the ground truth data, an example implementation characterizes variations in features of topic, time, and other aspects, such as the complexity of the information sought, per the number of searchers on a machine, show clear differences in all measures. Based on these insights, models are developed to accurately estimate when multiple people contribute to the logs ascribed to a single machine identifier, as well as to cluster search behavior on a machine, allowing for the accurate and automatic attribution of historical data in assigning new queries to the correct user.

Additionally, segregation of search activity beyond that applied by the Internet analytics company could be performed, although not in this example implementation. This includes the application of blind source separation methods used in signal processing, and methods from Web site activity clustering or fraud detection.

The data that used was provided under contract by an Internet analytics company that recruited an opt-in consumer panel validated to be representative of the online population and projectable to the total United States population. Millions of panelists provided explicit permission to passively measure all of their online activities using monitoring software installed on their computers. In exchange for joining the panel, participants are offered a variety of benefits, including computer security software, Internet data storage, virus scanning and chances to win cash or prizes.

The data comprised unfiltered search queries on major Web search engines, and collected over a two-year period from mid-2011 to mid-2013. The logs contained the text of queries, search result clicks, and the time that the events occurred (in user's local time). The logs also contained a machine identifier (assigned to the machine) and a person identifier (assigned to each person who used the machine). An application is installed on the machine to record search activity, and the machine enforces a rule that users indicate their user identifier to the logging software that they are using at any given time. Table 1 shows some basic data statistics including the average duration in days, defined as the time between the first and last observed query on each machine:

TABLE 1

| Statistic | Value |
| --- | --- |
| Total number of queries | 576,470,390 |
| Total number of machines | 1,748,425 |
| Average queries/machine | 328.89 (stdev = 1279.80) |
| Average duration (in days)/machine | 126.07 (stdev = 171.29) |
| Total number of users | 3,836,037 |

Using the data described above, behavioral and temporal features can be computed and examined. However, there are other features that may vary based on the number of users on a machine, including the topic of the content viewed, and the complexity of that information. For example, the complexity may represent age differences in searchers—suggesting the presence of more than one individual. To enable a richer analysis and of different feature sets, classifiers were employed to assign topical labels to the clicks using the hierarchy from the Open Directory Project (ODP) and the complexity of the queries/results, based on estimates of their U.S. school grade level (on a 1-12 scale). Features are computed based on behavioral, topical, temporal, and other features.

Multi-User Search Behavior

In this section, several characteristics of machines with different number of users are examined. The characteristics include behavioral, temporal, topical, and content characteristics.

Behavioral Characteristics

A number of different metrics may be used to characterize the search activity of users on single and multiple user machines. Some example metrics include (1) the number of queries per day, (2) the number of clicks per day, (3) the number of unique query terms per day, (4) the number of unique clicked URLs per day, and (5) the number of search sessions per day. To calculate the number of query terms, all queries are converted to lowercase, contiguous whitespace replaced with single space, and the query segmented into terms using space as a separator. To segment queries into sessions, a session break is introduced if the searcher is idle for more than 30 minutes. Similar criteria have been used in previous work to demarcate search sessions. It is noted the average search activity from multi-user machines is larger than single-user machines in these 5 example metrics.

Figure 3:
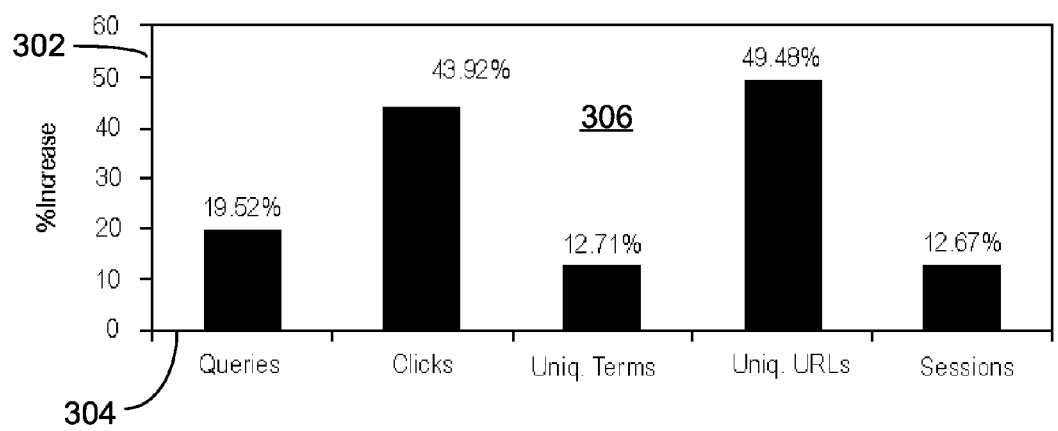
FIG. 3 is a graph showing average search activity from multi-user machines across all measures studied, according to embodiments described herein.

FIG. 3 is a graph 300 showing average search activity from multi-user machines across all measures studied, according to embodiments described herein. The percentage increase for the different metrics is shown in FIG. 3.

Temporal Characteristics

In addition to exploring properties of search activity on single and multiple user machines, the temporal usage behavioral patterns are also examined as the number of users per machine increases. One characteristic of the temporal behavior patterns may be described as day entropy, the distribution of search queries across days. Multi-user machines are expected to have usage that is more diverse across days given the searches performed by the machine's users on different days (given different constraints on their time from work, etc.). To validate this hypothesis, queries are divided into seven different buckets corresponding to the days of the week. The normalized entropy of the query distribution across days is computed as:

$$H = \frac{-\sum_{i=1}^{n} p(x_i)\log(p(x_i))}{\log(n)} \quad (1)$$

where n is the total number of outcomes (seven days). A value of zero would suggest that there is no uncertainty in the daily distribution of queries (i.e., all queries occur on the same day of the week). While a value of one would suggest maximum uncertainty (i.e., queries are evenly distributed across all seven days).

Figure 4A:
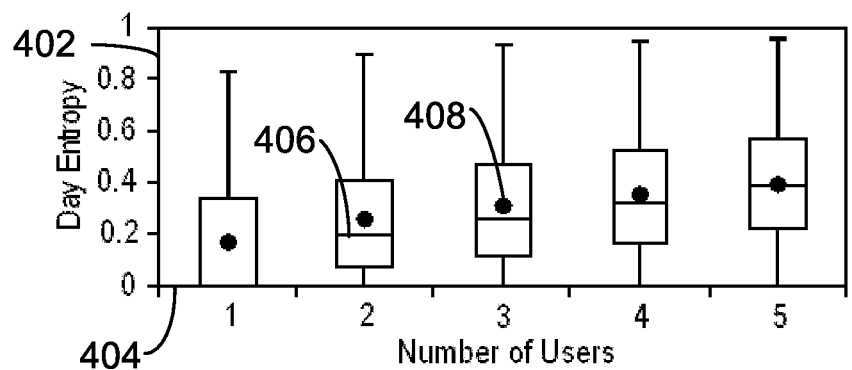
FIGS. 4A-4D are box-and-whisker plots for entropy and users, according to embodiments described herein.

FIG. 4A is a box and whisker plot for day entropy, in accordance with embodiments. The day entropy of all queries is shown in FIG. 4A for machines with 1 through 5 users using box-and-whisker plot 400A. The horizontal segments inside the boxes represent the median entropy 406. The mean 408 is the filled circle. For simplicity, machines with >5 users are not included since they account for <5% of the machines. Further, FIG. 4A shows that as the number of users per machine increases, the entropy increases, suggesting that machines with multiple users have more diverse daily usage patterns and, that this diversity grows as the number of searchers increases.

Figure 4B:
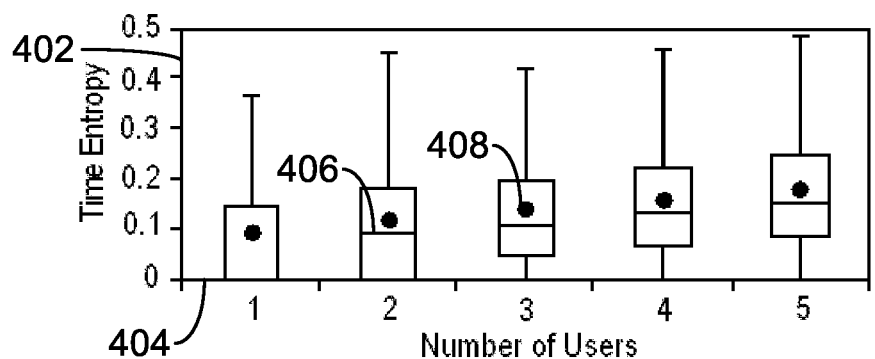

FIG. 4B is a box and whisker plot for time entropy, in accordance with embodiments. Another aspect of the temporal usage patterns concerns the time of the day at which the search activity occurs. Search queries are divided into six different equally-sized time buckets corresponding to following times of the day: morning (6 am-10 am), midday (10 am-2 pm), afternoon (2 pm-6 pm), evening (6 pm-10 pm), late night (10 pm-2 am) and overnight (2 am-6 am). The normalized entropy of the time buckets is computed as described earlier. The results are shown in FIG. 4B. In a similar way to the day entropy, a clear trend of entropy increasing as the number of users per machine increases. This suggests that users have fixed time preference when they search. Hence, when a machine has a single user, it typically has a low time entropy. However, when the number of users increases, and as their time preferences differ, especially since they are sharing a single resource (and cannot use it simultaneously), their temporal usage patterns become more diverse. This diversity leads to an increase in time entropy.

Topic and Content Characteristics

Topical and content complexity information has been used to model search behavior and to capture users' intent. To understand the relationship between topics and content and the number of users per machine may help understand whether topical profiles of single user machines differ from those of multiple user machines. Three different aspects of topics and the nature of the content that searchers seek: (1) topic entropy, (2) readability level entropy, and (3) between-topic association.

Figure 4C:
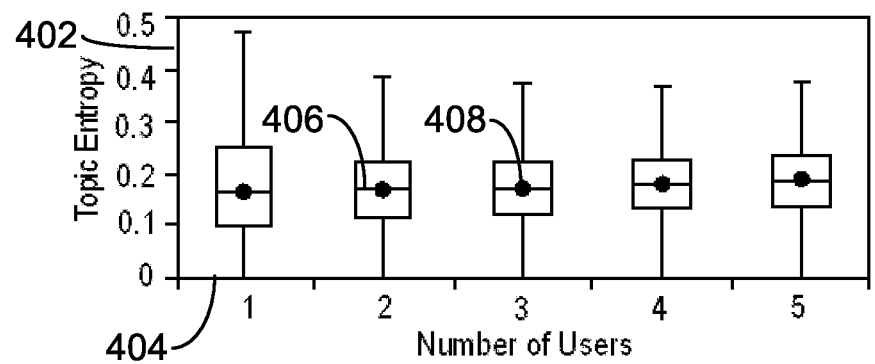

FIG. 4C is a box and whisker plot for topic entropy, in accordance with embodiments. A topic is assigned to each search query. The topic of every query is the plurality label of the topics assigned to the clicked URLs for that query. Queries that received no clicks were ignored. The Open Directory Project (ODP) was used to assign topics to documents, specifically ODP category labels. ODP is an open Web directory maintained by a community of volunteer editors. It uses a hierarchical scheme for organizing URLs into categories and subcategories. Many previous studies of Web search behavior have used ODP to assign topics to URLs.

After assigning topics to queries, topic entropy is calculated as described previously. The results are shown in FIG. 4C, where topic diversity increases as the number of users increase, even though the difference are smaller than the variations in the temporal entropies. The differences between the means 402 are still statistically significant at $p<0.05$ using a two-tailed t-test.

Figure 4D:
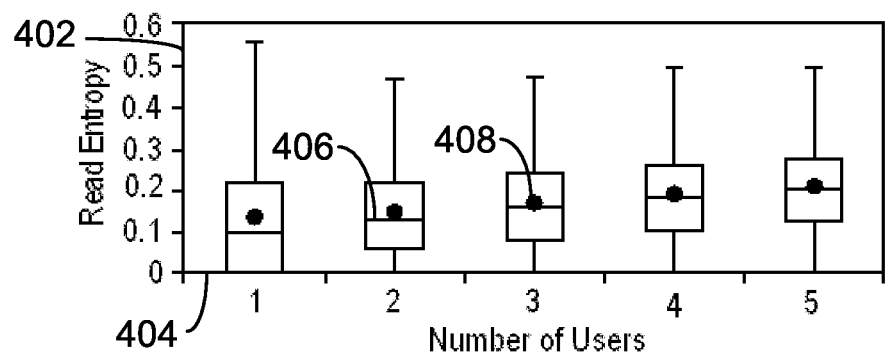

FIG. 4D is a graph representing readability entropy of all queries, in accordance with embodiments. Another aspect that is also correlated with topicality is the readability level of the text of the queries. It may be that the population of users sharing the same machine have different ages and this affects the sophistication of their search queries. It is unlikely there is high variance in readability level in single user machines compared to machines with multiple users. There may be additional variance if the multiple users are different ages.

Previous work has studied the problem of automatically assigning a readability level to text and used readability to improve result ranking. The readability level of any text fragment can be assessed by assigning a value on a 12-point scale mapped to U.S. school grade levels. The reading level predictor adopts a language modeling approach using a multinomial Naïve Bayes classifier. The entropy over the reading levels for machines with different number of users is shown in FIG. 4D, where the variance in readability level clearly increases with the number of users suggesting it could help predict the number of users on every machine.

Topic Association is also useful to search analysis. Many search applications (e.g., personalization, query suggestion, targeted advertising) are interested in answering the following question: If a user searches for topic A, are they also likely to be interested in topic B? In order to understand whether there is a difference between such associations on single user machines and multiple user machines, the following experiment was conducted. The association between all pairs of topics was determined using queries from single user machines. These are referred to as the "true" associations. This data is also collected from machines with multiple users, with an assumption the behavior is not dependent on the number of users. If this assumption is correct, there may be no difference between the two ways of computing the associations. If that assumption is incorrect (i.e., co-occurring topics on multiple user machines that do not typically occur together on single user machines), then there may be differences between the two ways of computing topic association.

To compute topic associations, it is assumed that two topics $T_i$ and $T_j$ co-occur if two queries $Q_i$ and $Q_j$ in the same time bucket (using the same time buckets defined earlier) such that the topic of $Q_i$ is $T_i$ and the topic of $Q_j$ is $T_j$. Given this co-occurrence definition, topic association is computed based on the normalized point wise mutual information between them:

$$NPMI(T_i T_j) = -\log \frac{p(T_i, T_j)}{p(T_i)p(T_j)} \bigg/ -\log p(T_i, T_j) \quad (2)$$

Figure 5:
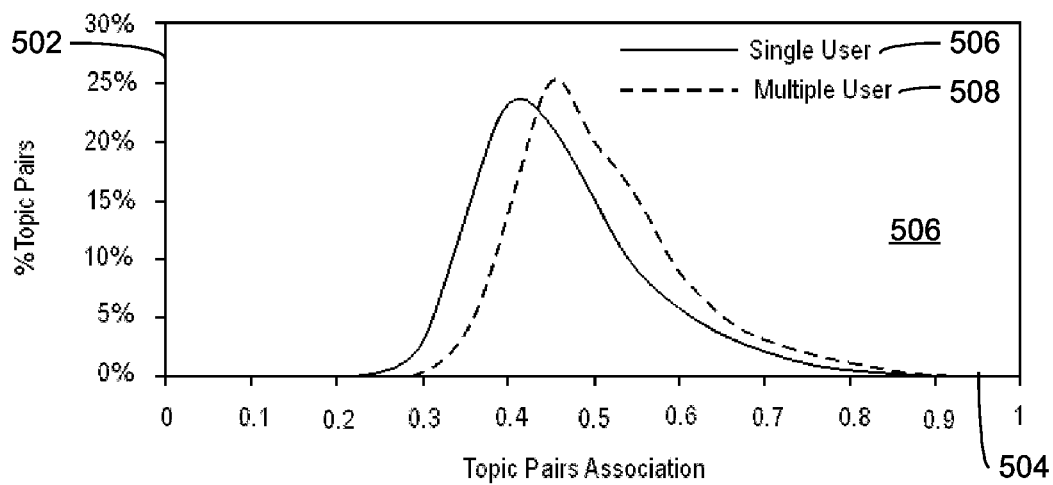
FIG. 5 is a graph showing topic associations derived from single user machines versus multi-user machines according to embodiments described herein.

FIG. 5 is a graph showing topic associations derived from single user machines versus multi-user machines according to embodiments described herein. To compare topic associations, the distribution of all topic associations derived from single user machines versus multi-user machines is plotted in FIG. 5. The associations from multi-user machines are clearly over-estimating the true associations. This is also shown in FIG. 6.

Figure 6:
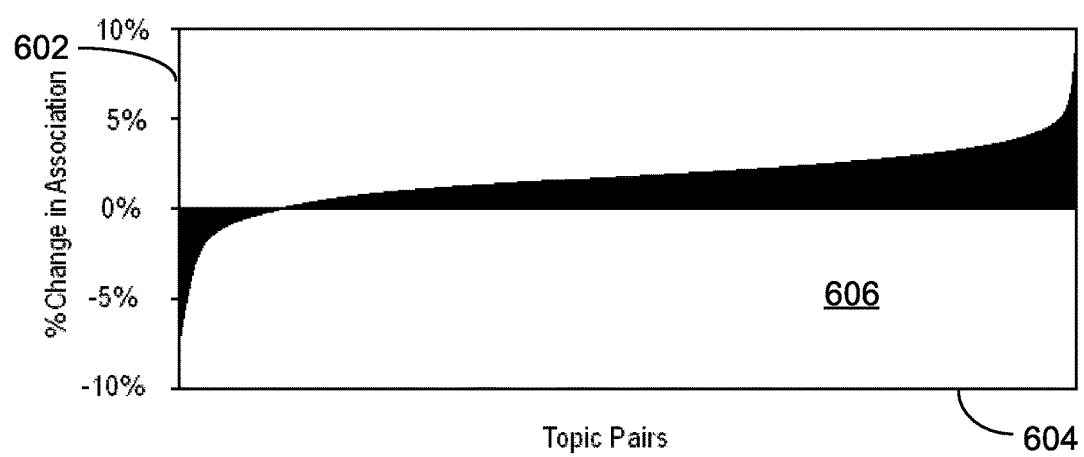
FIG. 6 is a graph showing distribution of all topic associations derived from single user machines versus multi-user machines according to embodiments described herein.

FIG. 6 is a graph 600 showing distribution of all topic associations derived from single user machines versus multi-user machines according to embodiments described herein. FIG. 6 shows the percentage change in association between all topic pairs when computed from multiple user machines, as compared with the true topic associations (most are positive). These findings show that when topics are co-occurring together on the same machine that typically have low association, it may be possible to reliably estimate that there are multiple users of that machine.

Multi-User Behavior Summary

There are differences in terms of search activity volume and temporal usage patterns. Although there are limited differences in topical variance across machines with different users, there are also differences in terms of readability level (which may provide insight into user age) and topical associations. In the next sections, models are described that leverage similar features to estimate the number of searchers per machine, cluster user behavior on a machine, attribute historical data, and automatically assign new queries to the correct user.

Predicting Multi-User Search

In the attribution scenario, embodiments are able to (a) estimate whether a machine identifier is composed of multiple searchers (binary classification), and (b) estimate the number of searchers whose search activity comprises that identifier (regression). Using features, such as those described previously, predictive models were developed capable of performing these tasks. Being able to predict whether a machine identifier is comprised of multiple searchers is a binary classification task. The regression results in a predicted number of users who use the machine. Since the regression results in a real value, the result is rounded to get an integer representing the number of users (k) on a machine identifier. This value of k can be used to inform the application of supervised clustering methods, such as k-means clustering. The binary classification task of identifying whether there the machine is single-user or multi-user is useful for search engines. For example, this information may help gate more sophisticated, and computationally expensive, analysis of the history from a particular machine identifier (such as clustering), or it can help decide whether personalization methods may be employed for an identifier.

Experimental Setting

Given the data described previously, features of the historic behavior were extracted from each of the 1.75M machine identifiers. Since there were varying history lengths in the data, and longer histories may be more likely to include multiple searchers, all features were normalized per day, or in the case of the few weekly features (e.g., Day-Entropy), normalized per week. This resembles how the classifier may be used in practice. At some point, the classifier is applied to historic logs, containing different amounts of search history for each machine identifier.

Multiple Additive Regression Trees (MART) were used for both the classification and regression tasks. MART uses gradient tree boosting methods for regression and classification. One advantages of employing MART includes model interpretability (e.g., a ranked list of features is generated), a facility for rapid training and testing, and robustness against noisy labels and missing values. The filters were experimented with on the total number of days to include identifiers in the analysis (e.g., filtering to only those identifiers with at least seven days between the first and last observed query), and they had little effect on the performance of the predictive models. Therefore, such filters were not used so as to gain broader coverage of the identifiers in the logs.

Ten-fold cross validation was employed across 10 experimental runs and the performance numbers are reported as averages across those runs. Since the unit in the experiments was machine identifier, and predictions are made at the identifier level, during the experiment an identifier was either in training set or the testing set, but not both. Evaluating between users in this way improves the robustness and generalizability of these findings since the predictors could scale to unseen machine identifiers.

Features

Approximately, 70 features of search behavior were observed at the machine identifier level. Many of these features were informed directly by the characterization described previously. The features were divided into five classes, summarized as follows:

Temporal: These features describe the time at which the query is issued, in terms of time of day (in four hour time buckets) and day of week, as well as variations in these features per number of unique time ranges and the entropy of those distributions defined as earlier. The rationale behind including the temporal features is that people may be likely to only access the machine at certain times given other time constraints imposed by other factors such as employment and education. The entropy of searching for adult material is included because it is a sensitive subject area, and unconstrained searching may result from fewer constraints on online behavior. The time between queries and sessions are also included as features, with the expectation that search activity may be sparser given fewer searchers behind the machine identifier.

Topical: Since searchers may have different topical interests, a number of aspects of the topicality were encoded of the queries issued and the results selected. Two classifiers were used: (1) a content-based classifier that assigns topical categories from the top-two levels of the ODP (e.g., "Arts/ Television") to URLs as described earlier, and (2) a proprietary classier that assigns topical categories to queries (e.g., images, movies, health); these are referred to hereafter as query categories. A number of measures are computed of the variation in the topic for the clicked URLs for the full category, the top-level, and the first category accessed in the session, since that may more accurately reflect user intentions. Changes in topics were featurized during query transitions to help represent the dynamics of the search interests. A number of specific classes are focused on which may be indicative of the number residents in the household and the number of users of the machine (e.g., the fraction of queries about shopping for child products (suggesting more users) or the fraction of queries on nightlife (suggesting fewer users)). The average distance (steps) in the ODP hierarchy is also computed, between pairs of topics accessed by searchers in sequence featurizing aspects of the topical focus. The featurization of the topical association is also shown to be useful.

Behavioral: This captures aspects of the search behavior on the machine, and includes features such as the number of sessions, the number of queries, and average query length. Variations in the average click rank and the entropy of the clicks (how diverse those are on average) are also captured. The rationale is that significant variations in search behaviors within a machine identifier may be attributable to multiple searchers. The findings of the analysis presented in FIG. 3 adds some support to this argument. Also included, is the average historic frequency of queries from search engine query logs (from a time period preceding the logs used in this study) since this may provide insight on the nature of searchers' information needs (e.g., less popular queries suggest specific needs).

Content: These features capture variations in the nature of the information that users of the machine seek and access. The rationale is that with more users on a machine, there is likely to be more variation in the type of content accessed. This class includes information on the resources accessed (URLs and Web domains), and top-level domains such as .com and .org, shown to reflect user differences in previous work. It is noted that this includes the reading level estimates for both the queries and the pages visited, and variations in those estimates across all queries and clicks in the search history. If there were multiple users, such as, a mixture of adults and children, there may be large variations in the reading level on the machine.

Referential: This class of features involved references to other people, such as, the word, "family," or people likely to share accommodation with the current searcher (e.g., husband, child, lodger). Table 2 presents a description of the specific prediction features from each class that were used in the experiments. The "P" footnotes indicate time-of-day classes.

TABLE 2

| Feature | Feature Description |
| --- | --- |
| Temporal class | |
| FractionWeekday | % of queries on a weekday |
| FractionWeekend | % of queries on a weekend |
| FractionQueries_Morning$^P$ | % of queries at 6 am-10 am |
| FractionQueries_Midday$^P$ | % of queries at 10 am-2 pm |
| FractionQueries_Afternoon$^P$ | % of queries at 2 pm-6 pm |
| FractionQueries_Evening$^P$ | % of queries at 6 pm-10 pm |
| FractionQueries_LateNight$^P$ | % of queries at 10 pm-2 am |
| FractionQueries_Overnight$^P$ | % of queries at 2 am-6 am |
| NumTimeBuckets$^P$ | Average number of buckets per day |
| NumDayBuckets | Average number of days per week |
| TimeEntropy$^P$ | H(Time bucket distribution) per day |
| DayEntropy | H(Day bucket distribution) per week |
| TimeBetweenQueriesAverage | Average time between queries |
| TimeBetweenQueriesVariance | Variance in time between queries |
| TimeBetweenSessionsAverage | Average time between sessions |
| TimeBetweenSessionsVariance | Variance in time between sessions |
| AdultTimeEntropy | H(Adult time bucket distribution) per day |
| Topical class | |
| TopicEntropy | H(ODP category assigned to clicks) |
| FirstTopicEntropy | First ODP category in session entropy |
| TopTopicEntropy | Top-level ODP category entropy |
| QueryCategoryEntropy | H(Query category) |
| FractionUniqueTopics | % of ODP topics unique |
| FractionUniqueQueryCategories | % of query categories unique |
| TopicDistance | Average inter-topic distance in ODP |
| TopicDistanceVariance | Variance inter-topic distance in ODP |

TABLE 2-continued

| Feature | Feature Description |
| --- | --- |
| NumUniqueTopics | # of unique ODP categories |
| NumUniqueQueryCategories | # of unique query categories |
| FractionTransitionsTopicShift | % of labeled query-query transitions with change in ODP category |
| NumUniqueTopLevelTopics | # unique top-level ODP categories |
| FractionUniqueTopLevelTopics | % unique top-level ODP categories |
| FractionQueries_Adult | % queries on Adult query category |
| FractionQueries_Cooking | % queries on ODP "Cooking" |
| FractionQueries_Family | % queries on ODP "Family" |
| FractionQueries_KidsAndTeens | % queries on ODP "Kids & Teens" |
| FractionQueries_Nightlife | % queries on ODP "Nightlife" |
| FractionQueries_ShoppingChild | % queries on ODP "Shopping/Children" |
| FractionQueries_VideoGames | % queries on ODP "Video Games" |
| TopicAssociation | Average topic association for all pairs |
| Behavioral class | |
| NumSessions | # search sessions |
| NumQueries | # search engine queries |
| NumUniqueQueries | # unique queries |
| NumUniqueQueryTerms | # unique query terms |
| FractionUniqueQueries | % query terms that are unique |
| QueryLength | Average query length (in characters) |
| QueryLengthVariance | Variance in query length |
| NumClicks | Number of clicks |
| AvgClickRank | Rank position of clicks |
| ClickEntropy | H(Search result clicks) |
| HistoricQueryPopularity | Historical query popularity in Bing logs |
| Content class | |
| DomainEntropy | H(Web domains visited), from clicks |
| QueryReadingLevel | Average query reading level (1-12) |
| QueryReadingLevelVariance | Variance in query reading level |
| QueryReadingLevelEntropy | H(Query reading level) |
| PageReadingLevel | Average landing-page reading level |
| PageReadingLevelVariance | Variance in landing-page reading level |
| PageReadingLevelEntropy | H(Landing page reading level) |
| NumUniqueTopLevelDomain | # unique top-level domains (e.g., .com) |
| FractionUniqueDomains | % of unique top-level domains |
| FractionUniqueURLs | % of unique URLs |
| NumUniqueURLs | # of unique URLs |
| NumUniqueDomains | # of unique Web domains |
| FractionUniqueQueryURLs | Fraction of unique query-URL pairs |
| Referential class | |
| FractionReferenceFamily | % queries containing term "family" |
| FractionReferenceHousemate | % queries with reference to housemate |

Classification Results

The classification task involves the binary prediction of whether a machine identifier has multiple users. For the baseline in this task, the marginal is used, which assumes that a machine identifier has multiple users, given the distribution reported in FIG. 1. Table 3 shows the performance measures for the full model, classes, and marginal, including on the average accuracy, precision, recall, and area under the receiver operating characteristic curve (AUC) across all experimental runs. The classification performance for each classifier is ordered by classification accuracy.

TABLE 3

| Features | Accuracy | Pos. Prec. | Pos. Recall | Neg. Prec. | Neg. Recall | AUC |
|---|---|---|---|---|---|---|
| All | 0.8635 | 0.8662 | 0.8973 | 0.8597 | 0.8196 | 0.9366 |
| Temporal | 0.8552 | 0.8531 | 0.8986 | 0.8582 | 0.7986 | 0.9267 |
| Topical | 0.8324 | 0.8399 | 0.8694 | 0.8218 | 0.7824 | 0.9105 |
| Content | 0.8271 | 0.8351 | 0.8651 | 0.8157 | 0.7776 | 0.9055 |
| Behavioral | 0.8096 | 0.8027 | 0.8795 | 0.8208 | 0.7185 | 0.8827 |
| Referential | 0.6450 | 0.8751 | 0.4342 | 0.5552 | 0.9193 | 0.6871 |
| Marginal | 0.5651 | 0.5651 | 1.0000 | 0.0000 | 0.0000 | 0.5000 |

Table 3 shows the performance of the classifier trained on all features (All). The accuracy was 0.8635 and the AUC was 0.9366, higher than the marginal classifier according using paired t-tests (p<0.001). Table 3 also shows the performance of classifiers each of the feature classes separately. The table shows that many of the feature classes perform well in isolation (all classifiers outperformed the marginal, all t(98)≥87.29, all p<0.001), although not quite as well as the complete combination of features in the full model.

Figure 7:
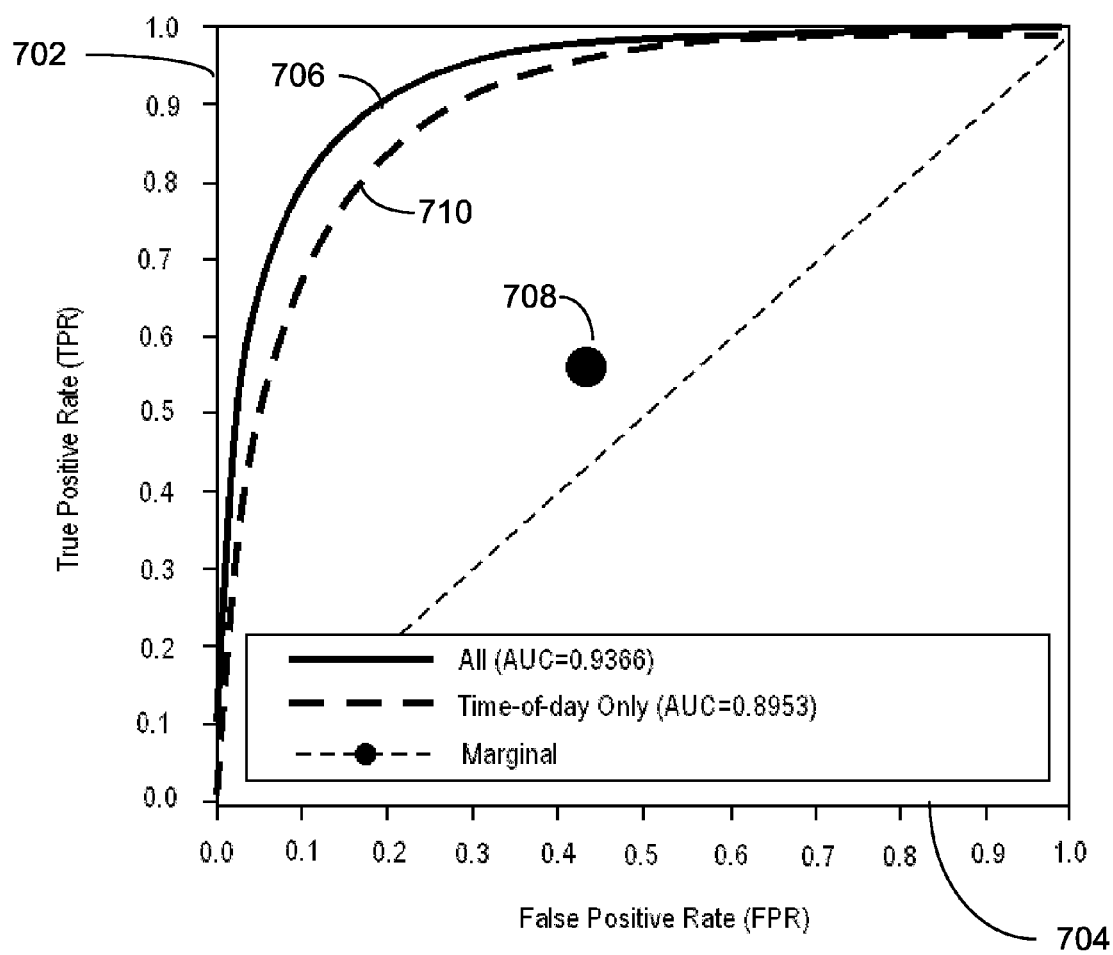
FIG. 7 is a graph showing percentage change in association between all topic pairs when computed from multiple user machines as compared the true topic associations according to embodiments described herein.

Since some features rely on search providers running sophisticated classifiers on queries and visited content, working with a minimal set of features may be useful. FIG. 7 shows the ROC 706 for the top-performing All model and, for reference, a single point denoting the performance 708 of the marginal classifier. Since the Temporal class 710 performed well, a pruned set of temporal features was used which merely featurize the times of day on which search was performed on the machine. The eight features used for this pruned time-of-day model are marked in Table 2 with superscript "P." The model performs well, with accuracy of 0.8272 (AUC=0.8953), even though only a small subset of features were used. To understand the performance of this classifier across the range of its discrimination threshold, its ROC curve is plotted in FIG. 7, which shows that it is possible to obtain reliable gains from simply using the time-of-day features. Useful features in this classifier included TimeEntropy (the variation in the times at which searchers are performed on the machine), and NumTimeBuckets (the number of distinct four-hour time windows with search activity), both of which may capture the spread of queries across the course of a day; which may be indicative of multiple searchers.

Regression Results

In addition to predicting whether an identifier is composed of multiple searchers, embodiments can also estimate the number of users generating the logs of that identifier (the k-value described earlier). Values of k in the range [1,10], are used, folding the rare cases where k>10 (0.05% of the data) into the k=10 bucket. This problem is framed as a regression task, using MART, although this time for regression, rather than classification. The mean absolute error (MAE) and the normalized root mean squared error (NRMSE) (defined as $RSME/(k_{max}-k_{min})$) are reported for the full feature set (All) and each of the five feature classes in Table 2. In addition, two baselines are employed: (1) predict k at random, and (2) predict k using its marginal distribution. The latter is a stronger baseline since it considers the prior distribution of individuals (in a held out set of machine identifiers from the dataset, log data was reserved for this purpose). Table 4 reports the performance of the regressor across all experimental runs for the feature classes and the two baselines evaluated in the study:

TABLE 4

| Features | MAE | NRMSE |
|---|---|---|
| All | 0.6377 | 0.0917 |
| Topical | 0.6906 | 0.1055 |
| Temporal | 0.7232 | 0.1146 |
| Content | 0.7490 | 0.1150 |
| Behavioral | 0.8054 | 0.1204 |
| Referential | 0.9784 | 0.1325 |
| Marginal | 1.4799 | 0.2150 |
| Random | 3.8078 | 0.4652 |

As shown, all of the regressors outperform the two baselines (all differences are at p<0.001). In addition, the regressor based on all of the features outperforms those regressors based on each of the classes separately, although the performance of some of the individual classes is still fairly strong. It is noted that the time-of-day features were less effective for this task than binary classification (pruned temporal model MAE=0.8598, NRMSE=0.1300). Overall, it was the Topical features that were found to be useful in predicting the value of k for a machine identifier. To help better understand this result, the feature weights were explored in the predictive models in more detail.

Also reported in the far right column of Table 4 are the p-values for comparisons with All for AUC (values for accuracy are similar). These findings concur with the characterization presented previously, which also showed that there are many ways in which multi-user search activity within a single machine identifier can be detected.

Feature Weights

One of the advantages of using MART is getting a list of features ordered by evidential weights. In Table 5, the top five features emerging from each of the prediction tasks, along with their assigned feature class, and their weight relative to the most important features: NumTimeBuckets (classification) and FractionQueries_KidsAndTeens (regression). In addition, to better understand the directionality of the features, Pearson product moment correlation (r) is also reported, and the point-biserial correlation in the case of the classifier, between the feature values and the ground truth labels in the dataset. Feature weights and correlation coefficients for features versus labels are also shown.

TABLE 5

| | Feature | Class | Weight | r |
|---|---|---|---|---|
| Classifier | NumTimeBuckets | Temporal | 1.0000 | +0.180 |
| | FractionWeekday | Temporal | 0.6353 | +0.444 |
| | FractionQueries_KidsAndTeens | Topical | 0.6031 | +0.159 |

TABLE 5-continued

|  | Feature | Class | Weight | r |
|---|---|---|---|---|
| Regressor | TimeEntropy | Temporal | 0.4306 | +0.233 |
|  | FractionReferenceOtherPerson | Referential | 0.3412 | +0.149 |
|  | FractionQueries_KidsAndTeens | Topical | 1.0000 | +0.271 |
|  | PageReadability | Content | 0.6108 | +0.395 |
|  | FractionQueries_ShoppingChildren | Topical | 0.5550 | +0.209 |
|  | FractionReferenceOtherPerson | Referential | 0.5496 | +0.199 |
|  | TopicEntropy | Topical | 0.3797 | +0.143 |

As shown in Table 5, the influential features span many classes, although for the classification task there appears to be more emphasis on temporal features (as also evidenced by the strong performance of the time-of-day features, shown in FIG. 7). However, for the regression task, the topical features appear more dominant, especially those suggesting the presence of others in the household, such as, children. Indeed, from analyzing the metadata associated with the logs used in the dataset, having a child present in the household is often associated with multiple individuals using the machine. Overall, on 82.1% of machines where a child is in the household there are multiple users, and the phi correlation ($r_\phi$) between child present (1/0) and multi-user usage of a machine (1/0) is 0.47 (p<0.001). There can be a number of reasons for this; if there is a family associated with the machine then shared usage is more likely. Topic information may also be able to capture the diversity of interests at different granularity than is possible with temporal bucketing (even simply because topics are more numerous), enabling more accurate estimates of user counts.

Multi-User Search Summary

Embodiments can accurately estimate when a machine identifier has multiple searchers, and estimate the number of users performing the activity attributed to an identifier. The output of the regressor is converted to a k value using standard rounding. As stated earlier, being able to estimate the number of searchers from their search behavior is not sufficient for tasks, such as, assigning incoming queries to individuals. For that task, a representation of the search activity for each searcher is used with a supervised clustering method. In this method, the number of clusters is determined by the output of this classifier. The application of this estimate in the task of clustering search activity from a machine identifier and attributing incoming queries to the correct person is described in greater detail below.

Attributing Search Behavior

Given the accurate prediction of multiple searchers on a machine, it is possible to further attribute search activity to individual searchers: (a) clustering the historic search activity guided by the number of clusters from the prediction task, (b) automatically assigning new search activity to the most likely searcher from historic logs. An individual search session is used to denote search activity here, though the attribution and assignment tasks below can be performed for search activity defined at a level of single query, a set of queries performed during session or multiple sessions together. One of the components for the task of attribution is measuring "similarity" between two search activities.

Similarity of Two Search Activities

Each search activity is represented as a set features, informed by the characterization and prediction results in previous sections. A vector representation is built of the issued query terms, clicked Web domains, search engine domains, ODP and query categories to serve as fingerprint of the activity. Given two search activities denoted by their representative features, around 20 features are selected which capture pairwise similarity and differences between two activities for different feature classes, as presented in Table 6, features for pairwise similarity of search activity:

TABLE 6

| Feature | Feature Description |
|---|---|
| Temporal class | |
| Diff_Weeks | Diff. in weeks |
| Diff_DayOfWeek | Diff. in day of week |
| Sim_Weekday | Both on a weekday |
| Sim_Weekend | Both on a weekend |
| Diff_TimeOfDay | Diff. in time of day |
| Diff_TimeBucket | Diff. in time bucket of a day |
| Topical class | |
| Sim_Topic | Vector cosine sim. of ODP categories (clicks) |
| Sim_QueryCategory | Vector cosine sim. of query categories |
| Sim_AdultQueryTerms | Vector cosine sim. of adult query terms |
| Sim_Adult | Both have queries on Adult query category |
| Sim_Cooking | Both have queries on ODP "Cooking" |
| Sim_Family | Both have queries on ODP "Family" |
| Sim_KidsAndTeens | Both have queries on ODP "Kids & Teens" |
| Sim_Nightlife | Both have queries on ODP "Nightlife" |
| Sim_ShoppingChild | Both have queries on ODP "Shopping/Children" |
| Sim_VideoGames | Both have queries on ODP "Video Games" |
| Behavioral class | |
| Diff_TotalDuration | Diff. in length of search activity (for session) |
| Diff_NumQueries | Diff. in # queries |
| Diff._QueryLength | Diff. in avg. query length (in characters) |
| Diff_NumClicks | Diff. in total number of clicks |
| Diff_HistQueryPop | Diff. in avg. historical query popularity |
| Content class | |
| Sim_Domains | Vector cosine sim. of web domains (from clicks) |
| Sim_QueryTerms | Vector cosine sim. of query terms |
| Sim_Engines | Vector cosine sim. of engine domains (queries) |
| Diff_QReadingLevel | Diff. in avg. reading level of queries |
| Referential class | |
| Sim_RefQueryTerms | Vector cosine sim. of referential query terms |
| Sim_RefQueries | Both have referential queries |

For vector-based features, e.g., a vector of query terms, the cosine similarity of two vectors was used to compute a similarity score. Features, such as, "Sim_Weekday," or, "Sim_Nightlife," represent a binary value denoting whether both the search activities share same attribute.

MART regression was used for learning a pairwise similarity function. As the base prior of two activities belonging to same searcher depends on the number of searchers, k, associated with a machine identifier, (e.g., similarity score is always 1 for single user machines). Different regression models were learned for each k. For creating training data a random sample of 10% of the machine identifiers was taken, and split into five groups containing 2, 3, 4, 5, and 6-10 users. The 6-10 users group was included as a range of k to provide sufficient training data. Next, the regression model was learned for each group separately as follows. Every pair of sessions for machines is considered in a group, the pairwise features between them are computed and labeled it as 1 if they belong to same searcher, otherwise 0. This labeled data is then used for training the regression model, which learns to predict a real valued number then used as the similarity score between two sessions.

Table 7 shows the most important features for pairwise similarity, ordered by evidential weight from MART. Table 7 represents results for 2-5 searchers. As the value of k increases, it was observed that content based features, such as those based on cosine similarity between query terms, become more important. Given these regression models, one for each different household size, it is possible to use them for clustering and attribution tasks. Content based features become more prevalent compared to temporal, with increase in the number of searchers.

TABLE 7

| Feature | Class | Weight |
| --- | --- | --- |
| Diff_Weeks | Temporal | 1.0000 |
| Diff_HistoricQueryPopularity | Behavioral | 0.3684 |
| Diff._TotalDuration | Behavioral | 0.2997 |
| Diff._QueryLength | Behavioral | 0.2739 |
| Sim_Engines | Content | 0.2687 |
| Diff_TimeOfDay | Temporal | 0.2182 |
| Diff_NumQueries | Behavioral | 0.2030 |
| Sim_QueryCategory | Topical | 0.2009 |
| Sim_QueryTerms | Content | 0.1937 |
| Diff_NumClicks | Behavioral | 0.1936 |
| Diff_Weeks | Temporal | 1.0000 |
| Diff_HistoricQueryPopularity | Behavioral | 0.4897 |
| Diff._TotalDuration | Behavioral | 0.3030 |
| Diff._QueryLength | Behavioral | 0.2903 |
| Sim_QueryTerms | Content | 0.2738 |
| Diff_NumClicks | Behavioral | 0.2395 |
| Sim_Engines | Content | 0.2366 |
| Diff_NumQueries | Behavioral | 0.2220 |
| Sim_QueryCategory | Topical | 0.2126 |
| Sim_Domains | Content | 0.1827 |

Clustering Searchers

The results of the task of clustering searchers' activities given a history of logs is now presented. To perform the clustering, machine identifiers which were used for task of learning similarity functions were excluded. The output of the regressor of the prediction task was used to estimate k. The k guides both the number of clusters to be used, as well as the choice of regression model to use for the similarity computation. For a given machine and predicted k, a pairwise similarity is computed for each pair of sessions. The k-means clustering is used with predicted k as the number of clusters and the computed similarity scores are applied.

Given the truth information of actual searchers for data, it is possible to use entropy and purity to measure performance at the clustering task. Entropy was computed, based on the distribution of different searchers in a cluster given truth, to measure the quality of the output of clusters and compare with the default baseline, which assigns all searchers to same cluster (as is currently the case with machine identifiers). Additionally the purity of the clusters is computed, denoting the fraction of the most representative searcher in a cluster. An effective clustering method would yield low entropy (ideal=0) and high purity (ideal=1).

Table 8 shows the average entropy and purity of the clusters obtained by the present techniques, vs. baseline (i.e., attributing all search activity to one searcher). All differences (i.e., reduction in entropy and increase in purity) are significant using t-tests at p<0.001. Table 8 reports the performance of the clustering task overall and then broken out by the number of users on the machine. Embodiments perform clustering with improvements (using t-tests at p<0.001) on both the metrics of entropy and purity.

TABLE 8

| k | Avg. Cluster Entropy | Avg. Cluster Purity | Baseline Entropy | Baseline Purity |
| --- | --- | --- | --- | --- |
| All (2-10) | 0.60 (−66%) | 0.61 (+31%) | 1.79 | 0.47 |
| 2 | 0.55 (−36%) | 0.81 (+20%) | 0.86 | 0.68 |
| 3 | 0.54 (−60%) | 0.71 (+29%) | 1.37 | 0.55 |
| 4 | 0.60 (−65%) | 0.62 (+32%) | 1.74 | 0.47 |
| 5 | 0.64 (−69%) | 0.55 (+33%) | 2.03 | 0.41 |
| 6-10 | 0.63 (−72%) | 0.52 (+35%) | 2.27 | 0.38 |

Assignment of Search Activity

Assignment of search activity is attributing newly-observed search activity to one of the searchers who contributed to the search history associated with a particular machine identifier. One challenge is that the historic logs are unlabeled; hence, there is no prior information of which activities in historic logs belong to which searchers. This task is addressed in two steps: (1) perform clustering on the historic logs as described previously, (2) assign the new search activity to one of the clusters.

The data was split for each machine into 90% historic logs, and the task of assignment was performed for the latest 10% queries. Given the truth labels, performance of assignment methods could be measured as follows. The accuracy of the assignment is computed by measuring the representation of the true searcher in the assigned cluster. A perfect attribution will first perfectly segregate the historic logs into different searchers (cluster purity=1), and assign the new activity corresponding to the right cluster (assignment accuracy=1). As a baseline, the default setup is considered in which new activity is assigned to all the historic activity.

Once again, the predicted output of number of searchers, k from the regression was used to guide the process for each machine. Based on the predicted k, the historic logs were clustered into k clusters, using the corresponding regression model described previously, for k as the similarity function. Next, a representative cluster is assigned to the newly observed search activity as the cluster containing the most similar activity. Given this cluster assignment and given the knowledge of the truth (i.e., the user to which the query should be attributed), the precision of this assignment is computed to measure the performance of this example implementation.

Table 9. Average accuracy of assigned cluster w.r.t to true searcher of the new activity, vs. default baseline (which attributes all historic search activity to single searcher). All differences are significant using t-tests at p<0.001.

Table 9 reports the performance of the assignment task overall and then broken down by each of the five groups. The results show significant improvement (using t-tests at p<0.001) in the accuracy of assignment compared to the default baseline which considers just one searcher per machine.

TABLE 9

| k | Assigned cluster | Baseline |
| --- | --- | --- |
| All (2-10) | 0.40 (+45%) | 0.28 |
| 2 | 0.70 (+36%) | 0.52 |
| 3 | 0.52 (+54%) | 0.34 |
| 4 | 0.42 (+56%) | 0.27 |
| 5 | 0.33 (+40%) | 0.24 |
| 6-10 | 0.27 (+37%) | 0.20 |

Summary

Embodiments described herein can improve the accuracy of search activity attribution, guided by the output of predicted number of searchers on a machine. These results can be used to segregate the activity of different searchers in historic logs. This segregation can further guide the accurate assignment of a searcher to new search activity in online settings.

Discussion

These applications would benefit from a cleaner historic signal derived from what is likely to be a single user. Beyond personalization of online services, there are also other applications such as long-term search satisfaction modeling, protecting privacy between multiple searchers on a single machine, and enhancing search logs with an estimated person identifier to enable more accurate data mining of metrics such as the number of sessions per unique user.

Moving forward, it is possible to employ alternative approaches to improve the performance of the activity attribution using methods such as those associated with blind source separation or conditional random fields to merge the output from multiple sources. Cost-benefit analyses can be used to understand whether this additional complexity is worthwhile given the strong performance observed with the methods presented here. As people own more devices and associate more closely with a particular device, a reduction in shared machine usage may occur over time. In addition, searchers are increasingly signing in to search engines (e.g., with their Google account), providing additional signals beyond the machine identifier. More research is needed to understand the effect of these factors on the methods.

Figure 8:
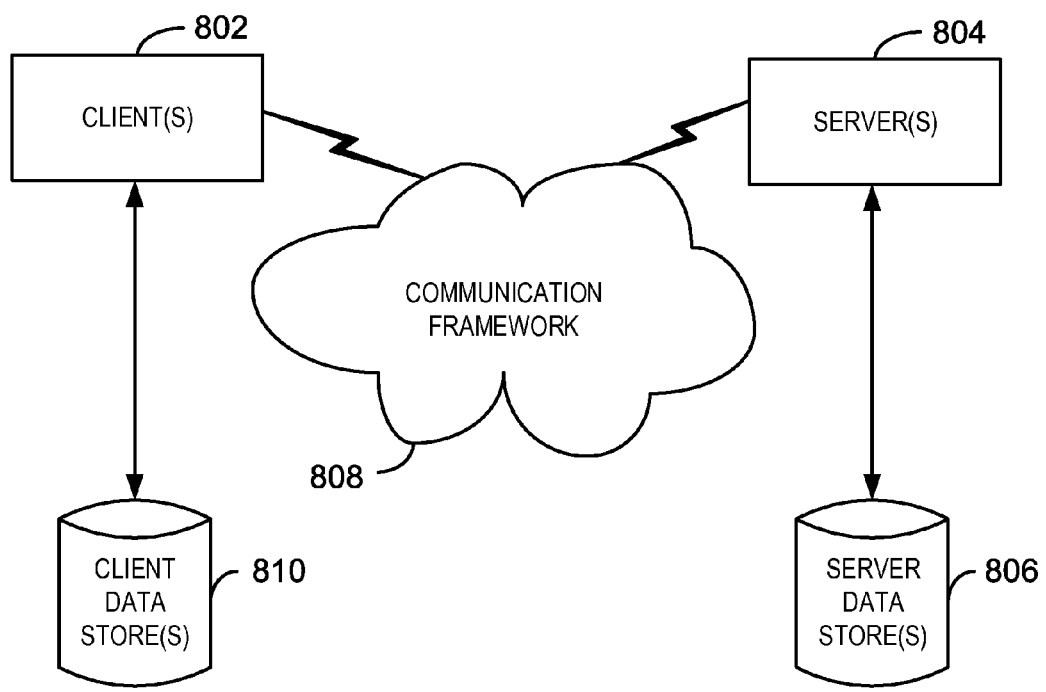
FIG. 8 is a block diagram of an exemplary networking environment for implementing various aspects of the claimed subject matter.

FIG. 8 is a block diagram of an exemplary networking environment 800 for implementing various aspects of the claimed subject matter. Moreover, the exemplary networking environment 800 may be used to implement a system and method that process external datasets with a DBMS engine.

The networking environment 800 includes one or more client(s) 802. The client(s) 802 can be hardware and/or software (e.g., threads, processes, computing devices). As an example, the client(s) 802 may be client devices, providing access to server 804, over a communication framework 808, such as the Internet.

The environment 800 also includes one or more server(s) 804. The server(s) 804 can be hardware and/or software (e.g., threads, processes, computing devices). The server(s) 804 may include a server device. The server(s) 804 may be accessed by the client(s) 802.

One possible communication between a client 802 and a server 804 can be in the form of a data packet adapted to be transmitted between two or more computer processes. The environment 800 includes a communication framework 808 that can be employed to facilitate communications between the client(s) 802 and the server(s) 804.

The client(s) 802 are operably connected to one or more client data store(s) 810 that can be employed to store information local to the client(s) 802. The client data store(s) 810 may be located in the client(s) 802, or remotely, such as in a cloud server. Similarly, the server(s) 804 are operably connected to one or more server data store(s) 806 that can be employed to store information local to the servers 804.

Figure 9:
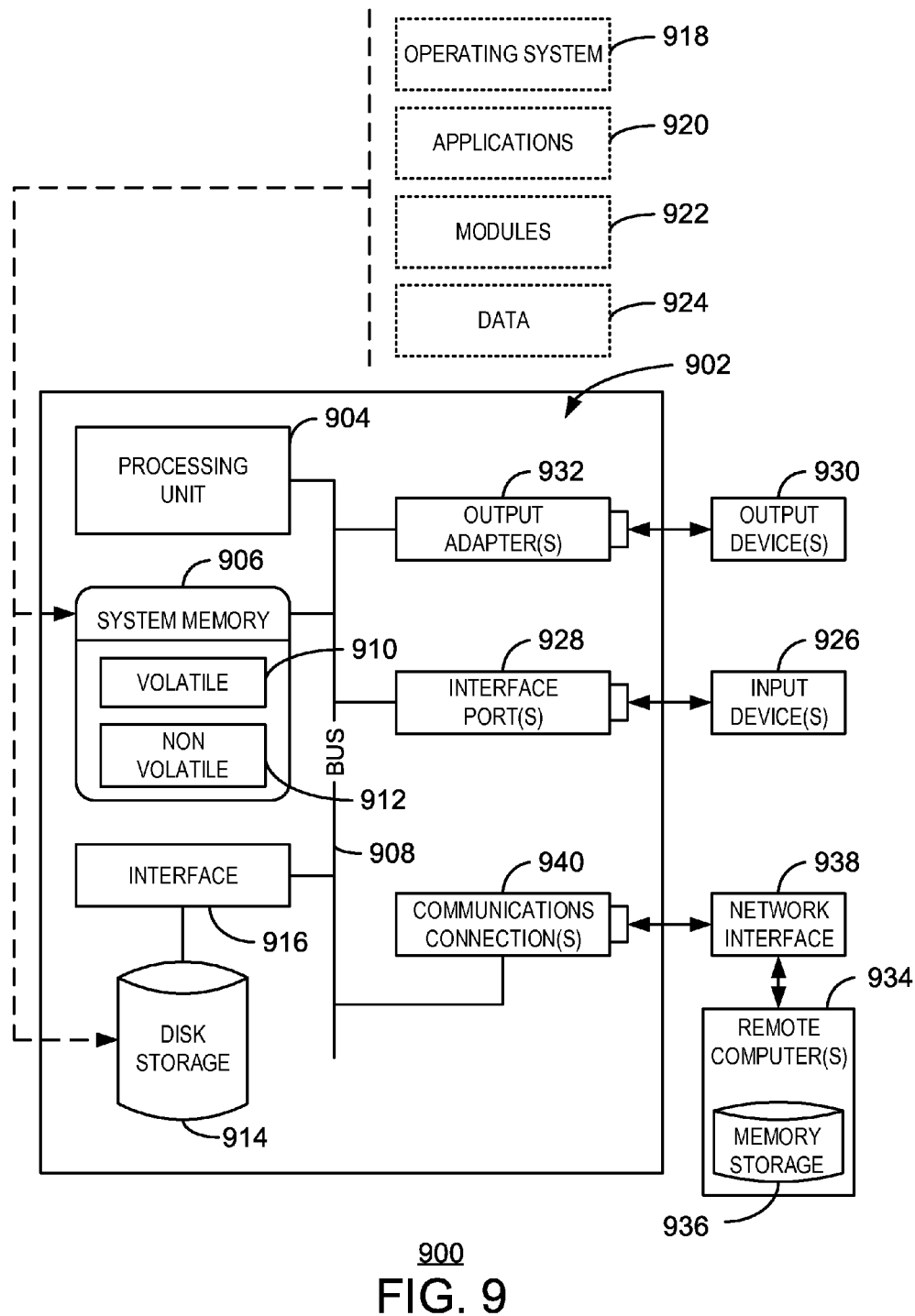
FIG. 9 is a block diagram of an exemplary operating environment for implementing various aspects of the claimed subject matter.

In order to provide context for implementing various aspects of the claimed subject matter, FIG. 9 is intended to provide a brief, general description of a computing environment in which the various aspects of the claimed subject matter may be implemented. For example, a method and system for fabricating full color 3D objects can be implemented in such a computing environment. While the claimed subject matter has been described above in the general context of computer-executable instructions of a computer program that runs on a local computer or remote computer, the claimed subject matter also may be implemented in combination with other program modules. Generally, program modules include routines, programs, components, data structures, or the like that perform particular tasks or implement particular abstract data types.

FIG. 9 is a block diagram of an exemplary operating environment 900 for implementing various aspects of the claimed subject matter. The exemplary operating environment 900 includes a computer 902. The computer 902 includes a processing unit 904, a system memory 906, and a system bus 908.

The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure, including the memory bus or memory controller, a peripheral bus or external bus, and a local bus using any variety of available bus architectures known to those of ordinary skill in the art. The system memory 906 includes computer-readable storage media that includes volatile memory 910 and nonvolatile memory 912.

The basic input/output system (BIOS), containing the basic routines to transfer information between elements within the computer 902, such as during start-up, is stored in nonvolatile memory 912. By way of illustration, and not limitation, nonvolatile memory 912 can include read only memory (ROM), programmable ROM (PROM), electrically programmable ROM (EPROM), electrically erasable programmable ROM (EEPROM), or flash memory.

Volatile memory 910 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 902 also includes other computer-readable media, such as removable/non-removable, volatile/nonvolatile computer storage media. FIG. 9 shows, for example a disk storage 914. Disk storage 914 includes, but is not limited to, devices like a magnetic disk drive, floppy disk drive, tape drive, Jaz drive, Zip drive, LS-210 drive, flash memory card, or memory stick.

In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used such as interface 916.

It is to be appreciated that FIG. 9 describes software that acts as an intermediary between users and the basic computer resources described in the suitable operating environment 900. Such software includes an operating system 918.

Operating system 918, which can be stored on disk storage 914, acts to control and allocate resources of the computer system 902.

System applications 920 take advantage of the management of resources by operating system 918 through program modules 922 and program data 924 stored either in system memory 906 or on disk storage 914. It is to be appreciated that the claimed subject matter can be implemented with various operating systems or combinations of operating systems.

A user enters commands or information into the computer 902 through input devices 926. Input devices 926 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. The input devices 926 connect to the processing unit 904 through the system bus 908 via interface ports 928. Interface ports 928 include, for example, a serial port, a parallel port, a game port, and a universal serial bus (USB).

Output devices 930 use some of the same type of ports as input devices 926. Thus, for example, a USB port may be used to provide input to the computer 902, and to output information from computer 902 to an output device 930.

Output adapter 932 is provided to illustrate that there are some output devices 930 like monitors, speakers, and printers, among other output devices 930, which are accessible via adapters. The output adapters 932 include, by way of illustration and not limitation, video and sound cards that provide a means of connection between the output device 930 and the system bus 908. It can be noted that other devices and systems of devices provide both input and output capabilities such as remote computers 934.

The computer 902 can be a server hosting various software applications in a networked environment using logical connections to one or more remote computers, such as remote computers 934. The remote computers 934 may be client systems configured with web browsers, PC applications, mobile phone applications, and the like.

The remote computers 934 can be a personal computer, a server, a router, a network PC, a workstation, a microprocessor based appliance, a mobile phone, a peer device or other common network node and the like, and typically includes many or all of the elements described relative to the computer 902.

For purposes of brevity, a memory storage device 936 is illustrated with remote computers 934. Remote computers 934 is logically connected to the computer 902 through a network interface 938 and then connected via a wireless communication connection 940.

Network interface 938 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connections 940 refers to the hardware/software employed to connect the network interface 938 to the bus 908. While communication connection 940 is shown for illustrative clarity inside computer 902, it can also be external to the computer 902. The hardware/software for connection to the network interface 938 may include, for exemplary purposes, internal and external technologies such as, mobile phone switches, modems including regular telephone grade modems, cable modems and DSL modems, ISDN adapters, and Ethernet cards.

An exemplary processing unit 904 for the server may be a computing cluster comprising Intel® Xeon CPUs. The disk storage 914 may comprise an enterprise data storage system, for example, holding thousands of impressions.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for attribution of activity in multi-user settings, the method comprising:
    determining an identified machine is used by multiple users by using a classifier that is trained using activity logs of the identified machine;
    estimating a number of the users for the identified machine by using an estimating regressor that is trained using the activity logs; and
    assigning a new activity to one of the users by determining a similarity between the new activity and activities of a plurality of clusters, wherein the similarity is determined using a pair-wise similarity function that is learned by training a similarity regressor, and wherein each of the clusters represents activities of one of the users.

2. The method of claim 1, the activity logs comprising logs of search activity.

3. The method of claim 2, comprising making a recommendation for the one user based on the activity logs, the recommendation comprising one of a movie, book, song, video, or game.

4. The method of claim 1, the activity logs comprising online activities.

5. The method of claim 1, comprising presenting search results for the new activity based on the one user.

6. The method of claim 1, comprising selecting features to classify search activity into clusters.

7. The method of claim 6, comprising classifying search activity based on temporal features of the search activity.

8. The method of claim 1, comprising allowing queries from multiple searchers on a shared machine to be hidden from other users.

9. The method of claim 1, comprising generating metrics for each of the users of the identified machine.

10. The method of claim 1, wherein assigning new activity comprises at least one of:
    applying blind source separation methods to the activity;
    Web site activity clustering;
    fraud detection; or
    diarization methods.

11. A system for attribution of search activity in multi-user settings, comprising:
    a processing unit; and
    a system memory, wherein the system memory comprises code configured to direct the processing unit to:
        determine an identified machine is used by multiple users by using a classifier that is trained using activity logs of the identified machine;
        estimate a number of the users for the identified machine by using an estimating regressor that is trained using the activity logs; and
        assign a new activity to one of the users by determining a similarity between the new activity and activities of a plurality of clusters, wherein the similarity is determined using a pair-wise similarity function that is learned by training a similarity regressor, and wherein each of the clusters represents activities of one of the users.

12. The system of claim 11, the system memory comprising code configured to direct the processing unit to make a recommendation for the one user.

13. The system of claim 12, the recommendation comprising one of a movie, book, song, video, or game.

14. The system of claim 11, the system memory comprising code configured to direct the processing unit to present a personalized advertisement for the one user.

15. The system of claim 11, the system memory comprising code configured to direct the processing unit to present search results for the new activity based on the one user.

16. The system of claim 11, the system memory comprising code configured to direct the processing unit to select features to classify search activity into clusters.

17. The system of claim 16, the system memory comprising code configured to direct the processing unit to classify search activity based on temporal features of the search activity.

18. One or more computer-readable storage memory devices for storing computer-readable instructions, the computer-readable instructions attributing search activity in multi-user settings when executed by one or more processing devices, the computer-readable instructions comprising code configured to:
    determine an identified machine is used by multiple users by using a classifier that is trained using activity logs of the identified machine;
    estimate a number of the users for the identified machine by using an estimating regressor that is trained using the activity logs;
    assign a new activity to one of the users by determining a similarity between the new activity and activities of a plurality of clusters, wherein the similarity is determined using a pair-wise similarity function that is learned by training a similarity regressor, and wherein each of the clusters represents activities of one of the users;
    and
    make a recommendation for the one user, the recommendation comprising one of a movie, book, song, video, or game.

19. The computer-readable storage memory devices of claim 18, comprising code configured to direct the processing unit to present search results for the new activity based on the one user.

20. The computer-readable storage memory devices of claim 19, comprising code configured to direct the processing devices to select features to classify search activity into clusters.

21. The method of claim 1, wherein determining the identified machine is used by multiple users comprises estimating a number of searchers associated with an identifier of the identified machine.

* * * * *